(12) United States Patent
Gunderson et al.

(10) Patent No.: US 7,874,846 B2
(45) Date of Patent: Jan. 25, 2011

(54) HERMETICALLY SEALED LIQUID CRYSTAL POLYMER INTERCONNECT

(75) Inventors: Neal F. Gunderson, Lake Elmo, MN (US); Daniel D. Dittmer, Shakopee, MN (US); Michael A. Mewes, Belle Plaine, MN (US)

(73) Assignee: Seagate Technology LLC, Scotts Valley, CA (US)

( * ) Notice: Subject to any disclaimer, the term of this patent is extended or adjusted under 35 U.S.C. 154(b) by 886 days.

(21) Appl. No.: 11/767,106

(22) Filed: Jun. 22, 2007

(65) Prior Publication Data

US 2008/0316641 A1 Dec. 25, 2008

(51) Int. Cl.
*G11B 33/14* (2006.01)

(52) U.S. Cl. .................. 439/66; 349/1; 360/97.02; 174/262

(58) Field of Classification Search ............... 439/66, 439/519, 935; 349/1; 360/97.02; 174/262
See application file for complete search history.

(56) References Cited

U.S. PATENT DOCUMENTS

| | | | |
|---|---|---|---|
| 3,820,150 A * | 6/1974 | Nicolaides | 257/4 |
| 4,826,451 A * | 5/1989 | Cunningham | 439/589 |
| 4,870,703 A * | 9/1989 | Augeri et al. | 360/98.07 |
| 6,053,744 A | 4/2000 | Gray et al. | |
| 6,168,459 B1 | 1/2001 | Cox et al. | |
| 6,270,375 B1 | 8/2001 | Cox et al. | |
| 6,320,257 B1 * | 11/2001 | Jayaraj et al. | 257/723 |
| 6,587,310 B1 | 7/2003 | Bennin et al. | |
| 6,856,490 B2 | 2/2005 | Rosner et al. | |
| 6,867,367 B2 | 3/2005 | Zimmerman | |
| 6,970,329 B1 | 11/2005 | Oveyssi et al. | |
| 6,982,480 B2 * | 1/2006 | Shi | 257/687 |
| 7,249,971 B2 * | 7/2007 | Burke et al. | 439/589 |
| 7,446,411 B2 * | 11/2008 | Condie et al. | 257/710 |
| 2003/0020149 A1 * | 1/2003 | Ogura et al. | 257/678 |
| 2003/0081357 A1 | 5/2003 | Hong et al. | |
| 2007/0251719 A1 * | 11/2007 | Sturdivant | 174/250 |
| 2008/0003493 A1 * | 1/2008 | Bates | 429/66 |

* cited by examiner

*Primary Examiner*—Gary F. Paumen
(74) *Attorney, Agent, or Firm*—Fellers, Snider, et al.

(57) ABSTRACT

A hermetically sealed housing encloses an inert gas atmosphere, and an electrical interconnect has at least one electrically conductive signal trace embedded onto a liquid crystal polymer (LCP) body to extend from an interior of the housing to an exterior of the housing.

20 Claims, 5 Drawing Sheets

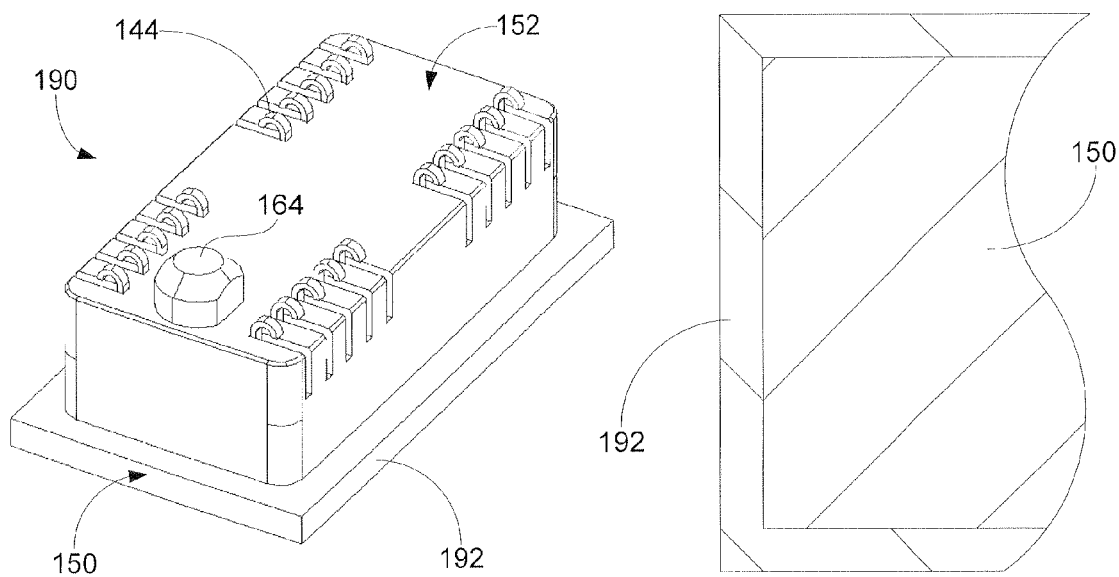
FIG. 8
FIG. 9
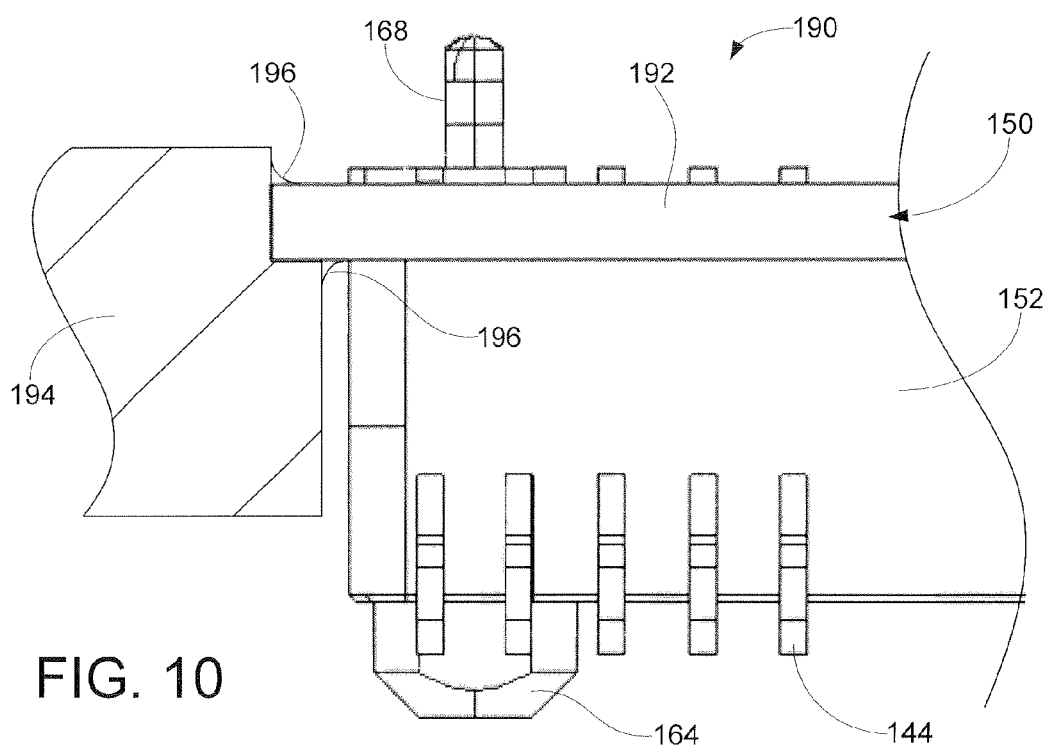
FIG. 10

HERMETICALLY SEALED LIQUID CRYSTAL POLYMER INTERCONNECT

BACKGROUND

It has been found desirable in some applications to provide a hermetically sealed housing. For example, data storage devices can be advantageously hermetically encapsulated to isolate an interior environment from contamination or other effects from the surrounding atmosphere.

The use of an internally enclosed inert gas atmosphere within a data storage device housing can also generally provide improved windage and hydrodynamic flight characteristics for read/write transducers adjacent a rotatable storage medium, as compared to a standard air atmosphere.

SUMMARY

Various embodiments of the present invention are generally directed to a hermetically sealed housing that encloses an inert gas atmosphere, and an electrical interconnect with at least one electrically conductive signal trace embedded onto a liquid crystal polymer (LCP) body to extend from an interior of the housing to an exterior of the housing.

BRIEF DESCRIPTION OF THE DRAWINGS

FIGS. 8-9 illustrate another interconnect in which selective metal overplating is applied to portions of the body to facilitate sealing of the interconnect with the housing.

FIG. 10 shows an exemplary installation of the interconnect of FIGS. 8-9 in a housing.

DETAILED DESCRIPTION

Figure 1:
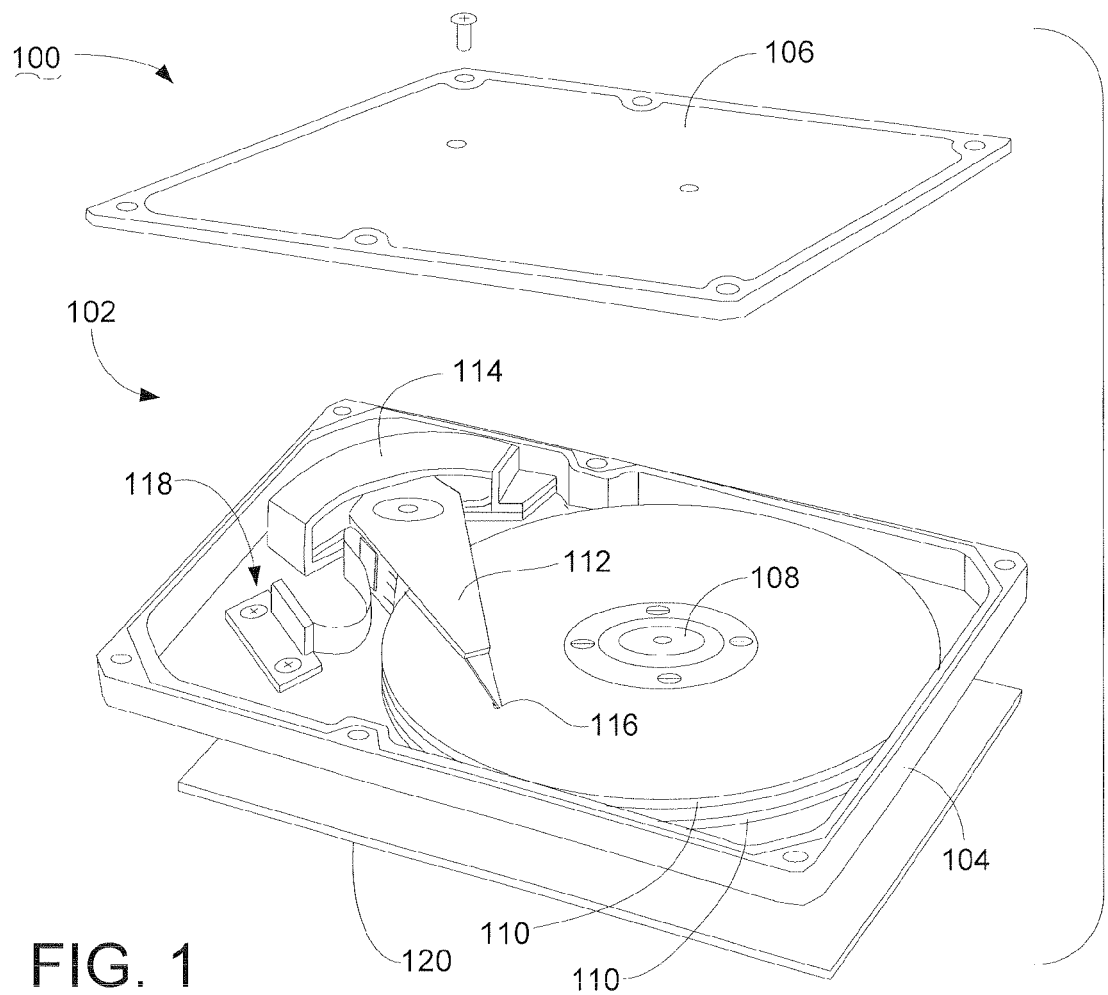
FIG. 1 is an exploded isometric view of an exemplary data storage device in which various embodiments of the present invention can be advantageously practiced.

FIG. 1 provides a top plan view of a data storage device 100. The device 100 is provided to show an exemplary environment in which various embodiments of the present invention can be advantageously practiced. It will be understood, however, that the claimed invention is not so limited.

The device 100 includes a sealed housing 102 formed from a base deck 104 and a top cover 106. A spindle motor 108 rotates a number of storage media 110. An actuator 112 rotates through application of current to a voice coil motor (VCM) 114 to align an array of transducers 116 with tracks defined on the media surfaces. A flex circuit assembly 118 establishes electrical communication paths between the transducers 116 supported at a distal end of the actuator 112 and device control electronics on an externally disposed printed circuit board (PCB) 120.

Figure 2:
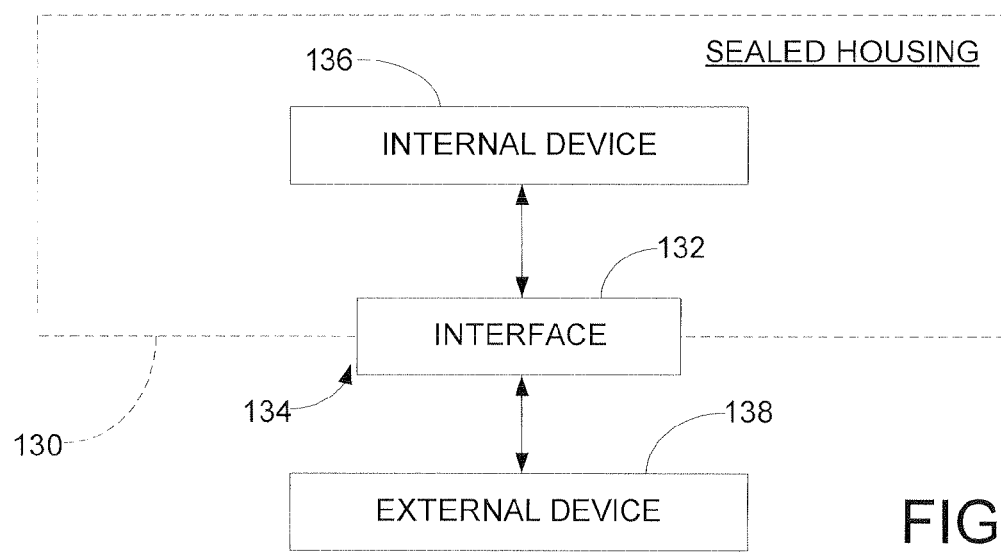
FIG. 2 provides a functional block representation of an interconnect configured in accordance with embodiments of the present invention to provide a signal path from an interior to an exterior of a hermetically sealed housing.

FIG. 2 shows a hermetically sealed housing 130 that encloses an inert gas atmosphere, such as a helium based atmosphere. The housing 130 is contemplated as corresponding to the data storage device housing 102 in FIG. 1, although such is not limiting.

An electrical interconnect 132 sealingly spans an aperture 134 through the housing 130 to provide a number of electrically conductive signal paths therethrough. The signal paths preferably facilitate electrical communication between an interior device 136 to an exterior device 138. The interconnect 132 is preferably formed of liquid crystal polymer (LCP). A suitable LCP material is commercially available under the trademark Zenite® by Dupont Corporation, Wilmington, Del., USA.

It has been found by the present inventors that LCP has relatively very low permeability characteristics for certain types of gases, and can be as much as about ten times less permeable to oxygen, water vapor and helium than other sealing materials such as certain epoxies. This permeability does not appear to be significantly affected by large changes in relative humidity (% RH) or temperature.

It has further been found that LCP has additional features that make it particularly suitable for use in establishing a hermetic seal as disclosed herein. LCP material can be filled with suitable fibers (glass, carbon, etc.) to improve the base resin material characteristics. LCP can also be selectively plated with a metallic or other electrically conductive layer, further reducing permeability to certain gases such as helium since certain metals can form a good sealing path against helium permeation.

Plating also facilitates the use of soldering or other metal joining techniques to form a hermetic bond line. With the use of appropriately selected fill and/or coating materials, the LCP interconnect can also be laser welded or ultrasonic welded to form the requisite sealing junctures to metal, glass, or other suitable materials (e.g., the housing 130). It has been found that the LCP crystalline properties are largely maintained in the weld region, due to maintaining high polymer chain continuity in the liquid or softened state. LCP is also easily molded into thin high precision three-dimensional shapes and can be over-molded to metals and other base materials.

Figure 3:
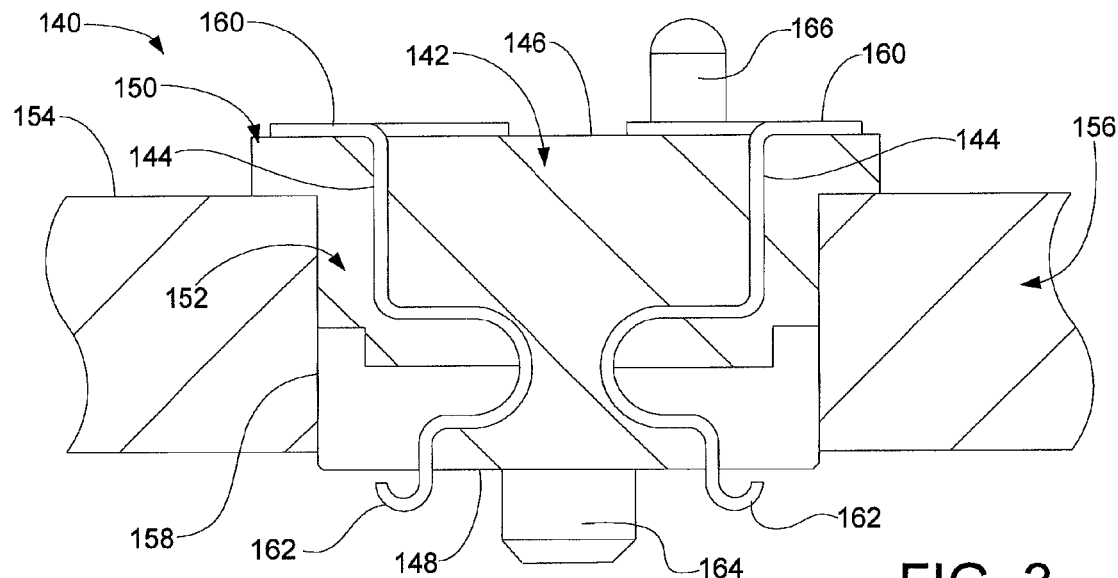
FIGS. 3-5 provide respective views of an interconnect employing a number of spring traces molded in a liquid crystal polymer body.
Figure 4:
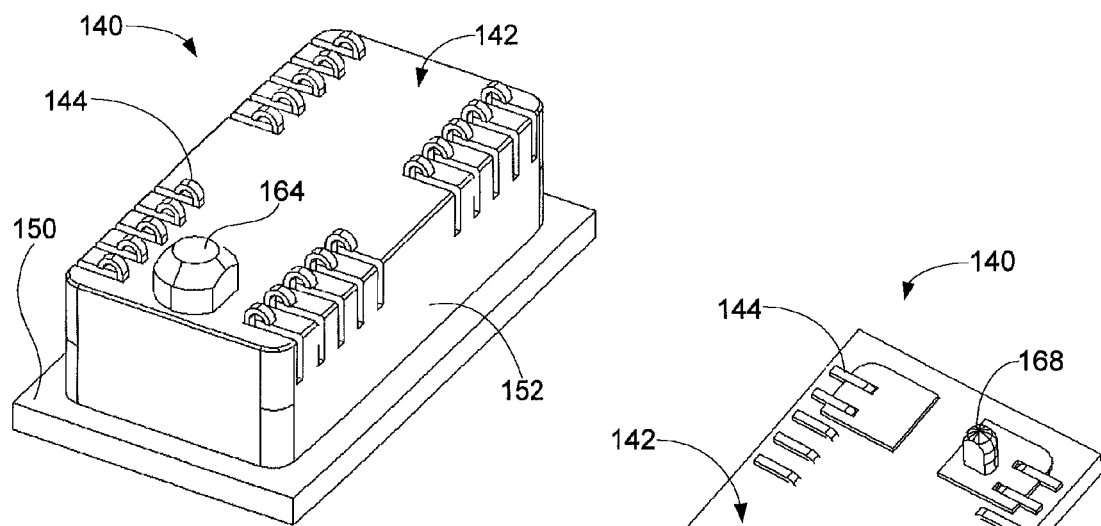
Figure 5:
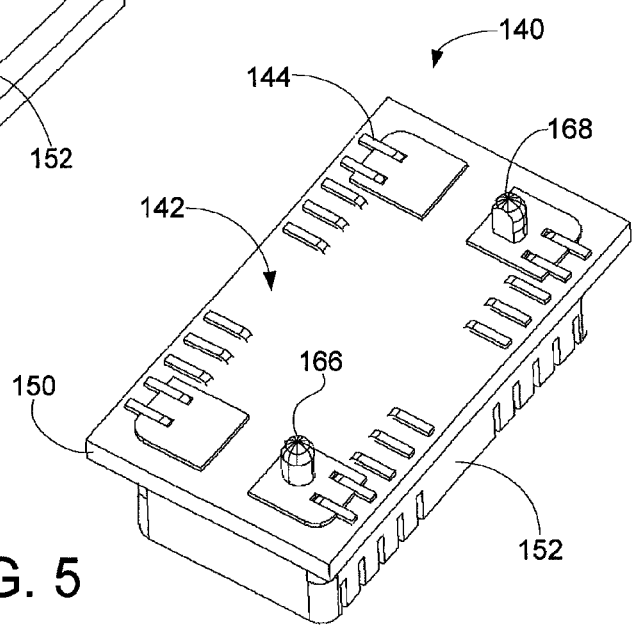

FIGS. 3-5 illustrate a first exemplary LCP interconnect 140 suitable for use in the arrangement of FIG. 2. FIG. 3 is a cross-sectional, elevational view, and FIGS. 4 and 5 show respective isometric views. The interconnect 140 preferably comprises a molded LCP body 142. Carbon or glass filled fibers of suitable volume can be incorporated into the body 142 as desired.

A number of signal traces 144 are embedded onto the body to extend therethrough from an upper surface 146 to a lower surface 148 thereof. The signal traces 144 are characterized as metallic or otherwise electrically conductive springs and follow a tortuous path through the molded LCP material to improve adhesion and reduce permeability of the encapsulated inert gas.

The body 142 includes a base flange 150 and a projection 152. The base flange 150 is sized to abut an interior surface 154 of a housing member 156, and the projection 152 extends through an aperture 158 therein. Selected surfaces of the base flange 150 and/or the projection 152 are sealed against the housing member 156 using any one of a number of suitable hermetic sealing mechanisms, including but not limiting to an epoxy, thermoset, welding, solder or overmold process. In this way, the perimeter of the interconnect 140 provides a suitably low permeable path between the interior and exterior of the housing.

The embedded traces 144 are shown to have opposing first and second ends 160, 162. The first ends 160 extend adjacent the upper surface 146 of the body 142 as fixed pad-type contacts to accommodate a suitable electrical connection member, such as the aforementioned flex circuit 118 of FIG. 1. The second ends 162 extend adjacent the lower surface 148 of the body in the form of deflectable spring contacts to engage a corresponding electrical connection member (not shown) such as on the PCB 120 of FIG. 1. Other configurations can readily be used, such as the use of spring contacts, or rigid pad-type contacts, on both ends of the traces 144. Guide pins 164, 166 and 168 aid in the proper alignment of the associated connections.

Figure 6:
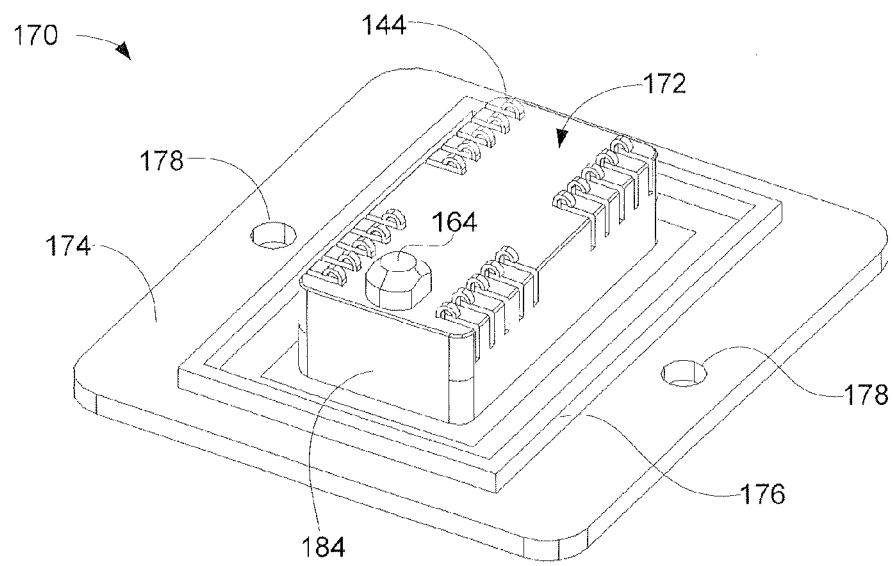
FIGS. 6-7 generally illustrate an alternative construction for the interconnect of FIGS. 3-5.
Figure 7:
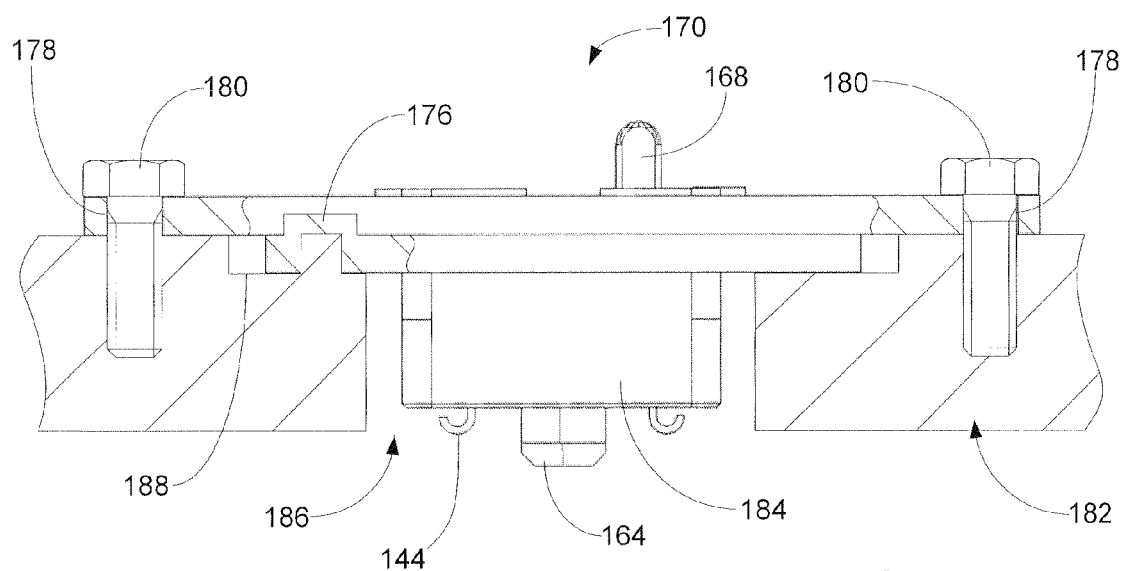
Figure 11:
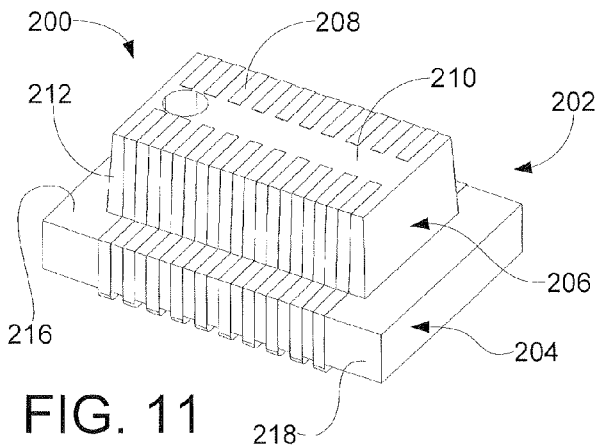
FIGS. 11-13 show yet another interconnect which utilizes a number of metallic signal traces overmolded onto a liquid crystal polymer body.
Figure 12:
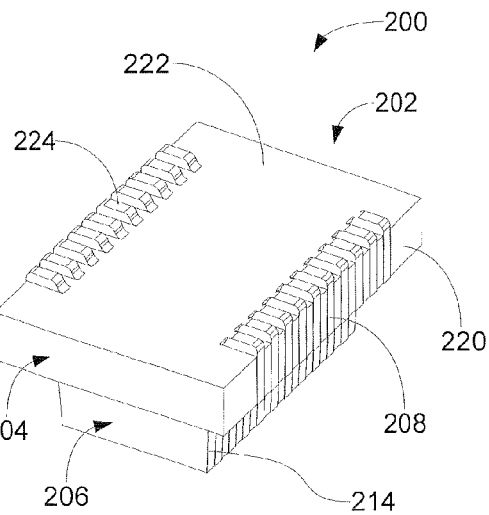
Figure 13:
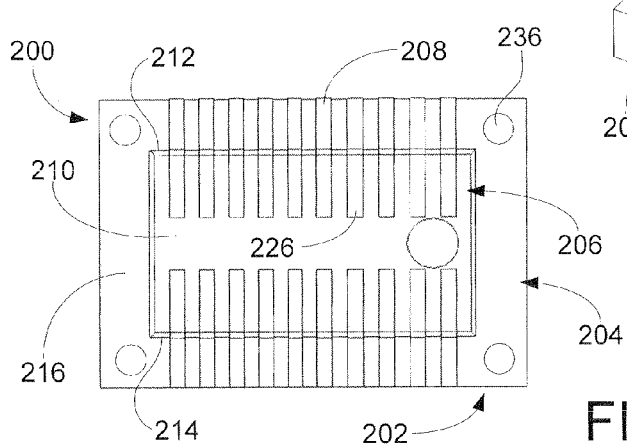

FIGS. 6 and 7 illustrate another LCP interconnect 170. The interconnect 170 includes a molded liquid crystal body 172 with the electrical traces 144 embedded thereon as before.

The interconnect 170 further includes a base flange 174 that is expanded in size as compared to the base flange 150 in FIGS. 3-5. The expanded base flange 174 accommodates a tortuous path for a circumferentially extending layer of sealing material 176, such as a thermoset low permeability plastic, as well as a number of hardware apertures 178.

As shown in FIG. 7, threaded hardware fasteners 180 are inserted through the apertures 178 to initially secure the interconnect 170 to a housing member 182. A projection portion 184 of the interconnect 170 extends in clearing relation through a stepped aperture 186 of the housing member 182, and the sealing material 176 abuts a recessed shelf surface 188 and is compressed thereagainst by the fasteners 180. Localized heating is applied to reflow the sealing material 176 and hermetically seal the interconnect 170 against the housing member 182.

The housing member 182 can alternatively be plated, coated or overmolded with a suitable material to effect the hermetic seal. An infrared absorbing material for use in a welding process is commercially available under the trademark Clearweld® by Gentex Corporation, Simpson, Pa., USA.

FIGS. 8-10 illustrate yet another interconnect 190 which includes the selective application of an outer plated metal layer 192 to the LCP body 142, in this case at least to selected portions of the base flange 150, as depicted in FIG. 9. Alternatively, substantially the entire outer surface of the interconnect 190 can be plated. Small isolated areas adjacent the traces 144 may be left unplated to prevent electrical shorting. Any suitable plating material can be used, such as but not limited to gold, nickel, copper, silver, etc. Nonmetallic plating materials can also be applied as desired.

As shown in FIG. 10, the plating layer 192 facilitates the adjoining of the interconnect 190 to the housing member 194 using a suitable process such as soldering or laser welding. Seam lines (joints) such as depicted at 196 provide sufficient wetting/reflow to form a circumferentially extending hermetic seal for the interconnect 190.

FIGS. 11-14 provide yet another alternative LCP interconnect 200 with LCP body 202 having a base flange 204 and projection 206. The LCP body 202 is filled with a suitable material such as glass or carbon. A number of spaced-apart electrically conductive traces 208 are embedded onto the body 202, such as via a suitable plating process. The traces 208 are selectively routed along opposing sides of the interconnect 200 so as to extend across successive outer surfaces 210, 212 and 214 of the projection 206, and across successive outer surfaces 216, 218, 220 (FIG. 11) and 222 (FIG. 12) of the base flange 204.

The traces 208 are formed of a suitable metal, such as gold, copper, nickel, silver, etc., and terminate at connection pads 224, 226 (see FIGS. 12-13) to engage suitable connections within and outside the housing, respectively.

Figure 14:
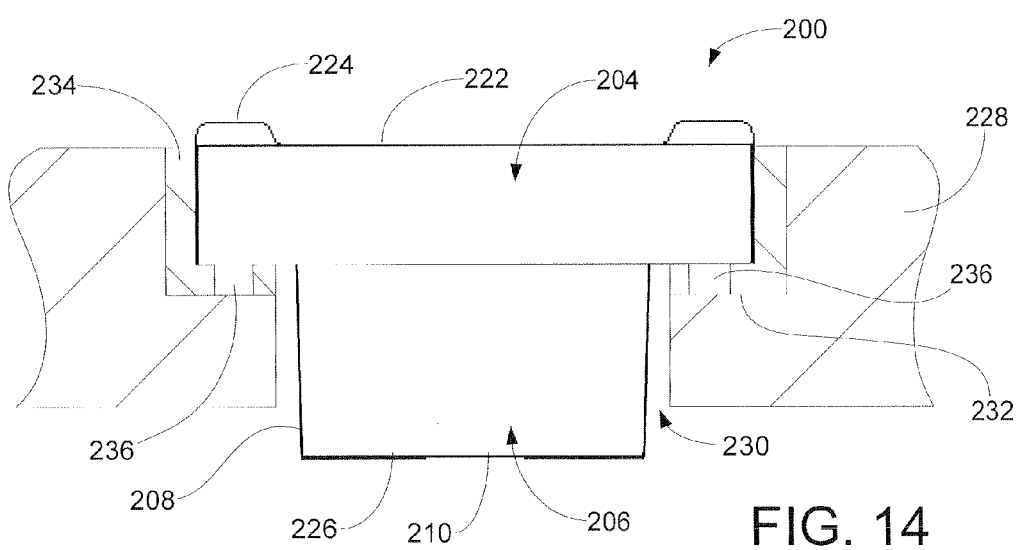
FIG. 14 shows an exemplary attachment of the interconnect of FIGS. 11-13 to a housing.

The interconnect 200 is mated with a housing member 228 having a stepped aperture 230 with a recessed shelf 232, as shown in FIG. 14. A suitable sealing layer 234, such as a layer of thermoset or other material, is applied so as to be interposed between and to sealingly engage the interconnect 200 and the housing member 228. The sealing layer 234 can also comprise an additional layer of LCP applied over the traces 208 using an overmolding operation. The sealing layer 234 forms a hermetic seal and encapsulates or otherwise isolates the traces 208 from the housing member 228.

Molded or machined standoffs 236 (FIG. 13) can also be used to ensure electrical isolation of traces 208 from the housing member 228. The standoffs 236 can extend from the body 202 as shown, or can extend from the housing member 228.

It will be appreciated that the various embodiments presented herein provide advantages over the prior art. Each of the above exemplary interconnects 140, 170, 190 and 200 advantageously establish one or more electrically conductive signal paths from an interior of a housing to an exterior of the housing. The use of an LCP material provides suitable low permeability characteristics to encapsulate an inert gas atmosphere, such as helium, within the housing while still providing an electrical signal path(s) for one or more signals to pass therethrough.

A variety of effective and cost efficient sealing mechanisms can be employed to seal the interconnects, such as but not limited to epoxy, thermoset, soldering, laser welding and overmolding. The interconnects are also well suited for incorporation into an automated assembly process.

While embodiments have been generally directed to a housing of a data storage device, such are merely illustrative and not limiting to the claimed subject matter. Rather, any number of suitable environments can be utilized as desired.

It is to be understood that even though numerous characteristics and advantages of various embodiments of the present invention have been set forth in the foregoing description, together with details of the structure and function of various embodiments of the invention, this detailed description is illustrative only, and changes may be made in detail, especially in matters of structure and arrangements of parts within the principles of the present invention to the full extent indicated by the broad general meaning of the terms in which the appended claims are expressed. For example, the particular elements may vary depending on the particular application without departing from the spirit and scope of the present invention.

What is claimed is:

1. An apparatus comprising:
   a hermetically sealed housing that encloses an inert gas atmosphere; and
   an electrical interconnect comprising at least one electrically conductive signal trace embedded onto a liquid crystal polymer (LCP) body to extend from an interior of the housing to an exterior of the housing.

2. The apparatus of claim 1, wherein the inert gas atmosphere substantially comprises helium.

3. The apparatus of claim 1, wherein the interconnect sealingly spans an aperture of the housing.

4. The apparatus of claim 1, wherein the at least one signal trace is characterized as a spring.

5. The apparatus of claim 1, wherein the at least one signal trace is characterized as a plated trace.

6. The apparatus of claim 1, wherein the electrical interconnect is molded to the housing.

7. The apparatus of claim 1, wherein the electrical interconnect is welded to the housing.

8. The apparatus of claim 1, wherein the body further comprises an overplated portion joined to the housing to form a hermetic seal.

9. The apparatus of claim 1, wherein the body comprises a base flange which abuts a surface of the housing, and a projection which extends through an aperture in the housing.

10. The apparatus of claim 1, wherein the body further comprises electrically insulative fibers in the LCP.

11. The apparatus of claim 1, further comprising a nonvolatile memory mounted within the housing and coupled to the signal trace.

12. The apparatus of claim 11, wherein the nonvolatile memory comprises a rotatable disc.

13. An apparatus comprising:
  a hermetically sealed housing comprising a rigid housing member; and
  an electrical interconnect sealingly coupled to the rigid housing member to establish an electrically conductive signal path from an interior of housing to an exterior of the housing, the interconnect comprising a liquid crystal polymer (LCP) body and at least one electrically conductive, embedded signal trace that extends adjacent the LCP body from the interior to the exterior of the housing.

14. The apparatus of claim 13, wherein the hermetically sealed housing and the electrical interconnect cooperate to enclose an inert gas atmosphere.

15. The apparatus of claim 13, wherein the interconnect sealingly spans an aperture of the rigid housing member.

16. The apparatus of claim 13, wherein the at least one signal trace is characterized as a spring onto which the LCP body is molded.

17. The apparatus of claim 16, wherein the spring takes a tortuous path through the LCP body.

18. The apparatus of claim 13, further comprising a nonvolatile memory mounted within the housing.

19. A data storage device, comprising:
  a hermetically sealed housing;
  a data storage memory disposed within the hermetically sealed housing; and
  an electrical interconnect coupled to the housing and comprising a liquid crystal polymer (LCP) body having at least one electrically conductive signal trace embedded thereon to establish an electrical signal path between the memory and an exterior of the housing.

20. the data storage device of claim 19, in which the hermetically sealed housing encloses an inert gas atmosphere.

* * * * *